No. 720,925. PATENTED FEB. 17, 1903.
F. F. JACKSON.
GATE.
APPLICATION FILED MAR. 5, 1902.
NO MODEL. 2 SHEETS—SHEET 1.
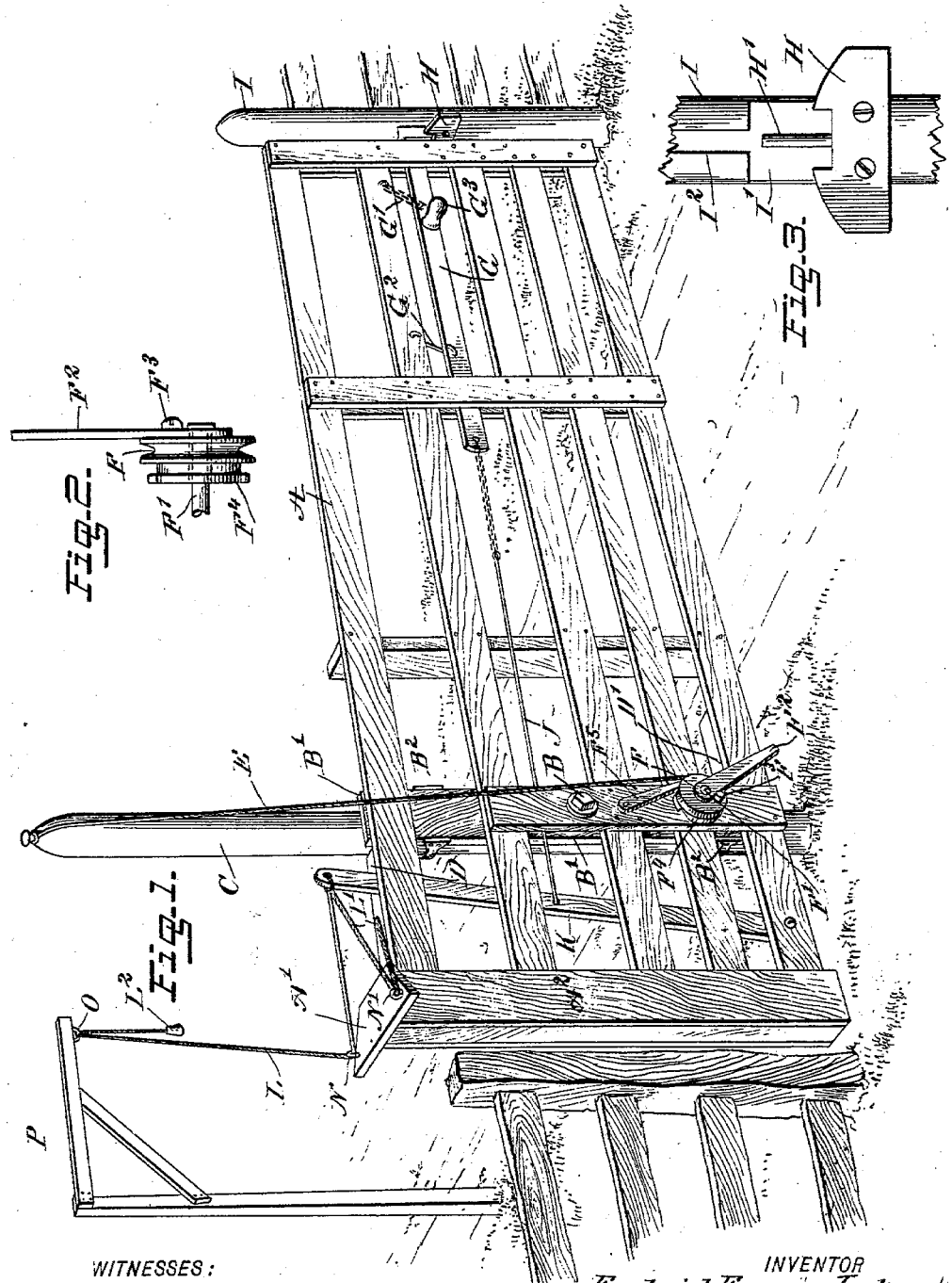
WITNESSES:
INVENTOR
Frederick Francis Jackson
BY
ATTORNEYS

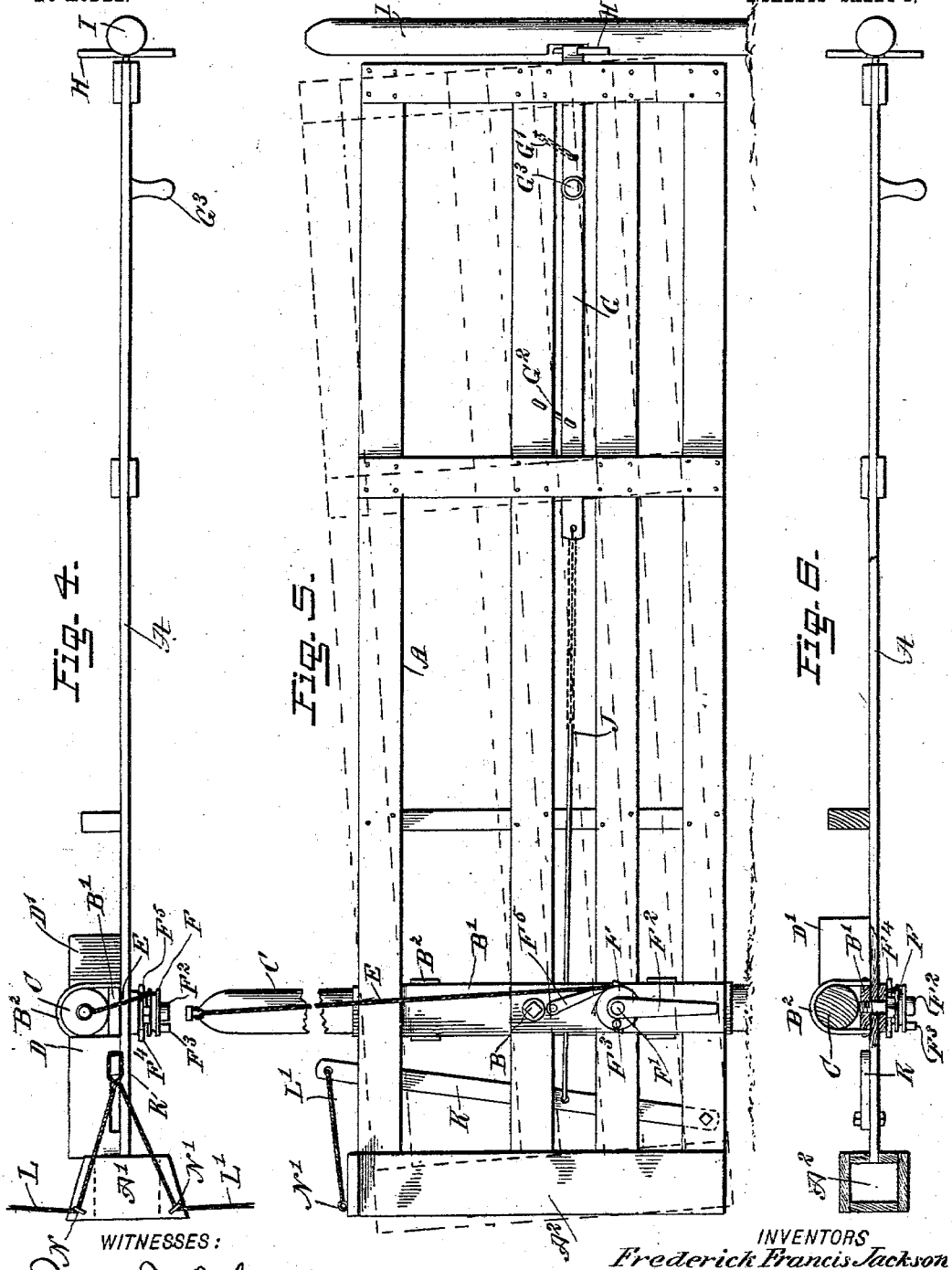

UNITED STATES PATENT OFFICE.

FREDERICK FRANCIS JACKSON, OF WAYNE TOWNSHIP, WAYNE COUNTY, INDIANA, ASSIGNOR OF ONE-HALF TO ELMER ELLSWORTH COMMONS, OF NEW PARIS, OHIO.

GATE.

SPECIFICATION forming part of Letters Patent No. 720,925, dated February 17, 1903.

Application filed March 5, 1902. Serial No. 96,780. (No model.)

*To all whom it may concern:*

Be it known that I, FREDERICK FRANCIS JACKSON, a citizen of the United States, and a resident of Wayne township, in the county of Wayne and State of Indiana, have invented a new and Improved Gate, of which the following is a full, clear, and exact description.

The object of the invention is to provide a new and improved gate, more especially designed for use on farms, driveways, and other places and arranged to permit a person to conveniently open and close the gate when on foot or in a wagon or on horseback and to allow of raising the gate bodily for small animals, such as sheep and swine, to pass under the gate without opening the same.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is an enlarged end elevation of the drum and locking device. Fig. 3 is an enlarged face view of the keeper-post and keeper. Fig. 4 is a plan view of the improvement. Fig. 5 is a side elevation of the same; and Fig. 6 is a plan view of the same, parts being shown in section.

The improved device, as illustrated in the drawings, is provided with a gate A proper, provided near one end with a pivot B, engaging a board B', provided with eyes or loops B², through which extends the pivot-post C, on which the gate A is mounted to swing horizontally and on which the gate can be bodily raised or lowered, as hereinafter more fully described. The board B' and its loops B² form a bearing for the gate, and by having the bearing hung on the pivot B the gate may be tilted vertically to raise, say, the free end of the gate to allow small animals to pass under the gate at the free end thereof without opening the gate.

On the gate A are arranged bearings D and D' in the shape of blocks, engaging opposite sides of the post C, one of the bearings being located on the upper portion of the gate and the other bearing, D', on the lower portion, as will be readily understood by reference to Fig. 1.

The gate A is held suspended on the post C by a rope, chain, or other flexible connection E, secured at its upper end to the top of the post C and winding at its lower end on a drum F, mounted to rotate loosely on a stud F', projecting from the gate A. On the stud F' is fulcrumed loosely a handle F², adapted to abut against a pin F³, projecting from the outer face of the drum F, so that when the operator swings the handle F² around it finally engages the pin F³, and on further turning the handle the drum F is turned to wind up the flexible connection E, so as to slide the gate A bodily upward on the post C. When the gate has reached the desired position, the drum is locked against return movement, and for this purpose the inner face of the drum is provided with a ratchet-wheel F⁴, adapted to be engaged by a pawl F⁵, fulcrumed on the gate A. When it is desired to lower the gate, then the operator swings the pawl F⁵ out of engagement with the ratchet-wheel F⁴ to allow turning of the drum F in an opposite direction to unwind the flexible connection E, and thus permit the gate to slide downward. Thus by the arrangement described the gate A may be raised or lowered to bring the same the desired distance above the ground, either when the gate is used for ordinary purposes or when it is desired to let small animals— such as sheep, swine, and the like—pass under the gate.

On the free end of the gate is arranged a longitudinally-extending latch G, hung on links G' and G², of which the forward link G' is preferably in the shape of a chain and the rear link is preferably in the shape or form of a rod. On the latch G is arranged a handle G³, adapted to be taken hold of by the operator on foot for lifting the latch out of engagement with the keeper H, secured to the keeper-post I, as plainly shown in Figs. 1 and 3. The keeper H is formed at its middle with a pin H', against which the latch G is adapted to abut when passing into the recess of the keeper from either side thereof. The post I in the rear of the top of the keeper H is formed with a flattened portion I' for the passage of the free end of the latch G, and from this flattened portion extends upwardly a groove I², forming a guideway for the free end of the latch when the gate is raised or lowered. Thus when the gate is raised or lowered or swung into an inclined position the latch G remains in engagement with the guideway, so that the gate A does not swing open unless the latch G is lifted out of engagement with the guideway. The rear end of the latch G has a flexible connection J with a lever K, fulcrumed at its lower end on the gate A and extending upwardly in the heel end of the gate to be within convenient reach of the operator when on foot.

On the upper end of the lever K are attached the inner ends of ropes L L', passing through eyes N N', secured on the top plate A' of the weight-box A², attached to the heel end of the gate for counterbalancing the latter. The ropes L L' extend from the eyes N N' in opposite directions, and each passes through an eye O, held on a support P, set a distance from the gate, as indicated in Fig. 1, the supports being erected on opposite sides of the gate in the usual manner. The downward-hanging end of each rope L L' is provided with a handle L², adapted to be taken hold of by a person on horseback or in a wagon to pull the rope L or L' to unlock the gate and swing it open or closed. The eyes N N' are set apart, so that a pull on a rope L or L' first swings the lever K toward the box A² to unlock the gate and a further pull on the rope L or L' exerts a pull by the lever K on the heel end of the gate to swing the gate open or closed.

Having thus described my invention, I claim as new and desire to secure by Letters Patent—

1. A gate, comprising a gate proper, a bearing to which the gate is pivoted to tilt vertically, a post upon which the bearing is mounted to turn and slide, and a device for supporting the gate from said post, as set forth.

2. A gate, comprising a gate proper, a bearing to which the gate is pivoted to tilt vertically, a post upon which the bearing is mounted to turn and slide, a device for supporting the gate from the said post, a latch on the free end of the gate, and a keeper-post having a vertical guideway, and a keeper below the guideway, as set forth.

3. A gate, comprising a post, a gate proper, a bearing to which the gate is pivoted said bearing having a sliding and turning connection with the post, a drum mounted on the gate, and a cord or rope having one end secured to the drum and its other end to the post above the top of the gate, as set forth.

4. A gate, comprising a gate proper, a post projecting above the gate, a bearing to which the gate is pivoted, said bearing being provided with loops loosely engaging the post to permit the gate to slide and turn thereon, a drum mounted on the gate, a cord or rope having one end secured to the drum and its other end to the upper end of the post, and a pawl and ratchet for locking the drum, as set forth.

5. In a gate, the combination with a post, of a gate pivoted to tilt vertically and mounted to slide vertically and to swing horizontally on said post, as set forth.

6. In a gate, the combination with a post, of a vertical board mounted to slide and turn on said post, and a horizontal pivot connecting the gate with the said board, as set forth.

7. In a gate, the combination with a pivot-post, a keeper-post provided with a transverse recess and a vertical groove extending upwardly from the recess, and a gate mounted on the pivot-post to slide vertically and to swing horizontally, of a latch provided with a handle and hung by links at the free end of the gate, one of the links being flexible, a keeper secured to the keeper-post and provided at the middle of its recess with a pin or stop, and means connected with the rear or inner end of the latch, whereby the latch can be swung on the links and the gate swung into an open or closed position, as set forth.

In testimony whereof I have signed my name to this specification in the presence of two subscribing witnesses.

FREDERICK FRANCIS JACKSON.

Witnesses:
A. M. GARDNER,
ELMER TOWNSEND.